US008200515B2

(12) United States Patent
Natsuyama et al.

(10) Patent No.: US 8,200,515 B2
(45) Date of Patent: *Jun. 12, 2012

(54) SYSTEM AND METHOD FOR THEME PARK LINE QUEUE MANAGEMENT

(75) Inventors: Keizo Natsuyama, Osaka (JP); Steven C. Blum, Orlando, FL (US); Justin Michael Schwartz, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/297,098

(22) Filed: Nov. 15, 2011

(65) Prior Publication Data
US 2012/0066013 A1   Mar. 15, 2012

Related U.S. Application Data

(63) Continuation of application No. 12/139,724, filed on Jun. 16, 2008, now Pat. No. 8,082,165.

(51) Int. Cl.
G06Q 10/00 (2006.01)
G06Q 50/00 (2006.01)
G07C 11/00 (2006.01)
H04L 12/28 (2006.01)

(52) U.S. Cl. ............ 705/5; 705/1.1; 705/6; 340/286.06; 370/412

(58) Field of Classification Search .................. 705/1.1, 705/5, 6; 340/286.06; 370/412
See application file for complete search history.

(56) References Cited

U.S. PATENT DOCUMENTS

| 5,502,806 | A | 3/1996 | Mahoney et al. |
| 5,566,327 | A | 10/1996 | Sehr |
| 5,978,770 | A | 11/1999 | Waytena et al. |
| 5,987,420 | A | 11/1999 | Maeda et al. |
| 5,987,421 | A | 11/1999 | Chuang |
| 6,173,209 | B1 | 1/2001 | Laval et al. |
| 6,529,786 | B1 | 3/2003 | Sim |
| 6,748,364 | B1 | 6/2004 | Waytena et al. |
| 6,785,539 | B2 | 8/2004 | Hale et al. |
| 6,813,608 | B1 | 11/2004 | Baranowski |
| 6,845,361 | B1 | 1/2005 | Dowling |
| 6,889,098 | B1 | 5/2005 | Laval et al. |
| 7,047,205 | B2 | 5/2006 | Hale et al. |
| 7,212,983 | B2 | 5/2007 | Redmann et |

(Continued)

FOREIGN PATENT DOCUMENTS
EP    958553    11/1999
(Continued)

OTHER PUBLICATIONS

O'Brien, Tim, Six Flags Debuts Queue Management, Mar. 5, 2011, Amusement Business, 113, 9, pp. 3.

(Continued)

Primary Examiner — Fadey Jabr
(74) Attorney, Agent, or Firm — Fletcher Yoder

(57) ABSTRACT

The present disclosure describes a method for managing theme park ride lines by providing an identifying device to a guest, the device configured to uniquely identify the guest, using the identifying device to ascertain an amount of time a guest spends at a predetermined location and reducing the amount of time a guest spends in a line queue for a predetermined ride by the amount of time the guest spends at the predetermined location. A system for managing theme park ride lines is also provided.

20 Claims, 2 Drawing Sheets

U.S. PATENT DOCUMENTS

| | | |
|---|---|---|
| 7,222,080 B2 | 5/2007 | Hale et al. |
| 7,400,932 B2 | 7/2008 | Ackley et al. |
| 7,505,474 B2 | 3/2009 | Walter |
| 7,516,148 B2 | 4/2009 | Waytena et al. |
| 7,532,941 B2 | 5/2009 | Hale et al. |
| 7,720,718 B2 | 5/2010 | Hale et al. |
| 7,787,965 B2 | 8/2010 | Hale et al. |
| 7,788,215 B2 | 8/2010 | Trowbridge et al. |
| 7,801,629 B2 | 9/2010 | Hale et al. |
| 7,895,066 B2 | 2/2011 | Waytena et al. |
| 2002/0007292 A1 | 1/2002 | Paxton et al. |
| 2002/0046068 A1 | 4/2002 | Koh |
| 2002/0082897 A1 | 6/2002 | Menelly et al. |
| 2002/0116235 A1 | 8/2002 | Grimm et al. |
| 2004/0117219 A1 | 6/2004 | Sugimoto et al. |
| 2004/0158482 A1 | 8/2004 | Hale et al. |
| 2004/0172316 A1 | 9/2004 | Hale et al. |
| 2005/0045710 A1 | 3/2005 | Burke |
| 2005/0060173 A1 | 3/2005 | Hale et al. |
| 2005/0240453 A1 | 10/2005 | Lyons |
| 2005/0278215 A1 | 12/2005 | Seele Jr |
| 2007/0168390 A1 | 7/2007 | Mardirossian |
| 2007/0203763 A1 | 8/2007 | Ackley et al. |
| 2007/0286220 A1 | 12/2007 | Stenning |
| 2008/0040172 A1 | 2/2008 | Watkins |
| 2008/0071587 A1 | 3/2008 | Granucci et al. |
| 2008/0080445 A1 | 4/2008 | Bayne et al. |
| 2008/0133283 A1 | 6/2008 | Backer et al. |
| 2008/0197984 A1 | 8/2008 | Peters et al. |
| 2008/0270305 A1 | 10/2008 | Andreasson et al. |
| 2009/0063205 A1 | 3/2009 | Shibasaki |
| 2009/0204449 A1 | 8/2009 | Waytena et al. |
| 2009/0313062 A1 | 12/2009 | Natsuyama et al. |
| 2009/0319306 A1 | 12/2009 | Chanick |
| 2010/0063854 A1 | 3/2010 | Purvis et al. |
| 2010/0328025 A1 | 12/2010 | Razdan |

FOREIGN PATENT DOCUMENTS

| | | |
|---|---|---|
| EP | 1696327 | 8/2006 |
| WO | 03034350 | 4/2003 |
| WO | 2004047353 | 3/2004 |
| WO | 2005124699 | 12/2005 |
| WO | 2007004047 | 1/2007 |
| WO | 2008041875 A1 | 4/2008 |
| WO | 2008128583 | 10/2008 |
| WO | 2010089771 | 8/2010 |

OTHER PUBLICATIONS

SafeTzone Announces Cashless Purchasing, Line Management and Data Analysis as New Products to Be Available to Amusement Parks for Summer 2003, Nov. 20, 2002, PR Newswire, pp. 1.

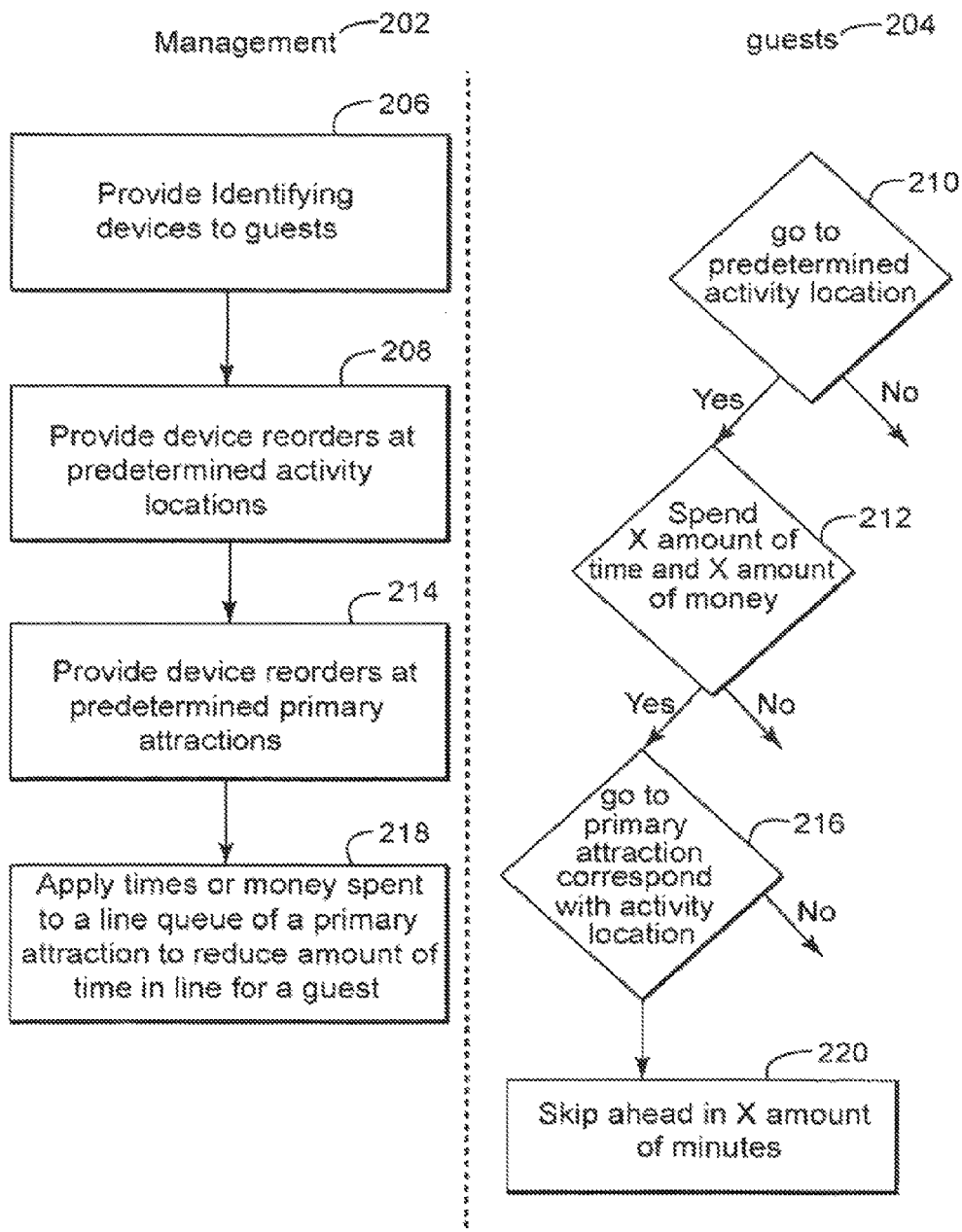

SYSTEM AND METHOD FOR THEME PARK LINE QUEUE MANAGEMENT

This application is a continuation of U.S. patent application Ser. No. 12/139,724, entitled "System and Method for Theme Park Line Queue Management", filed on Jun. 16, 2008, the entirety of which is incorporated herein by reference.

BACKGROUND OF THE INVENTION

The present invention relates to theme or amusement parks. More specifically, the present invention relates to managing queue time in attraction lines.

Since the early twentieth century, amusement parks and theme parks have been growing and expanding at a tremendous rate. As parks have expanded, so has the number of guests that attend. While guests have demanded bigger, better, and more elaborate rides, they also require and expect a positive Park experience, which entails progressively shorter waits to enter a ride. In the past, guests have been forced to wait hours in line to ride some of the more popular rides at a Park.

Long ride lines present a myriad of problems for park operators. First, long lines lead to leads to guest unhappiness, which lowers the rate of return visits. Second, long lines can lead to unrealized revenue. For example, while guests come to theme parks primarily for the rides, they also come for secondary attractions, such as restaurants, food stands, carnival games, and souvenir shops. As guests spend more and more time in line, they are unable to spend time and money dining, shopping and playing carnival games.

Methods and systems have been developed to shorten lines and prevent long wait times for guests. For example, U.S. Pat. No. 5,987,420 issued to Maeda describes a reservation system that allows patrons or guests to obtain reservations for various rides ahead of time. However, patrons can make an unlimited number of reservations. This can result in earlier patrons reserving all ride time slots leaving only less popular rides for late arriving patrons.

An attempt to manage this problem is described in U.S. Pat. No. 6,173,209 issued to Laval describes a reservation and line management system where patrons are allowed to make reservations for only one attraction at a time. By allowing only one reservation at a time, patrons are unable to schedule their entire day, including time taken for lunch and dinner. Many times, groups will split up and rejoin at a later time during the day. In the Laval patent, patrons can only make schedules one or two hours ahead, because they are limited to one reservation. Moreover, if the only available reservation for a desired attraction is late in the day, the usefulness of this system declines, as the patron may be limited in the number of reservations the patron can make throughout the day.

A further attempt to relieve long lines is described in U.S. Patent Application U.S. 2002/0116235 A1 (Grimm et al.) which describes a system and method of operation that allows guests to purchase advance ticket packages containing e.g., pre-paid parking, reserved times for multiple attractions, reservations for meals, or use of a guest key as a credit or debit card. In addition, the system and separate method of operation allow guests to make reservations for reserved access to attractions, such as rides, live action-shows, etc. or for dining or theatrical shows, etc. However, none of the above description provide guests with an incentive to visit the secondary attractions (e.g., restaurants, food stands, carnival games, and souvenir shops).

Accordingly, to date, there is no suitable system or method to manage theme park ride lines that provides incentive to visit secondary attractions.

BRIEF DESCRIPTION

The present disclosure describes a system and method for managing theme park ride lines.

In a first embodiment, the invention provides a method for managing theme park ride lines comprising providing an identifying device to a guest, the device configured to uniquely identify the guest, using the identifying device to ascertain an amount of time a guest spends at a predetermined location, and reducing the amount of time a guest spends in a line queue for a predetermined ride by the amount of time the guest spends at the predetermined location.

In a second embodiment, the invention provides a system for managing theme park ride lines comprising a guest identification device, the device configured to uniquely identify the guest, and a processor in communication with the guest identification device and configured to ascertain an amount of time a guest spends at a predetermined location, wherein the processor is further configured to reduce the amount of time a guest spends in a line queue for a predetermined ride by the amount of time the guest spends at the predetermined location.

Other features and advantages of the disclosure will become apparent by reference to the following description taken in connection with the accompanying drawings.

BRIEF DESCRIPTION OF THE DRAWINGS

Reference is now made briefly to the accompanying drawings, in which:

FIG. 2 is flow chart describing a step-wise method in accordance with a further embodiment of the present invention.

Like reference characters designate identical or corresponding components and units throughout the several views, which are not to scale unless otherwise indicated.

DETAILED DESCRIPTION

Figure 1:
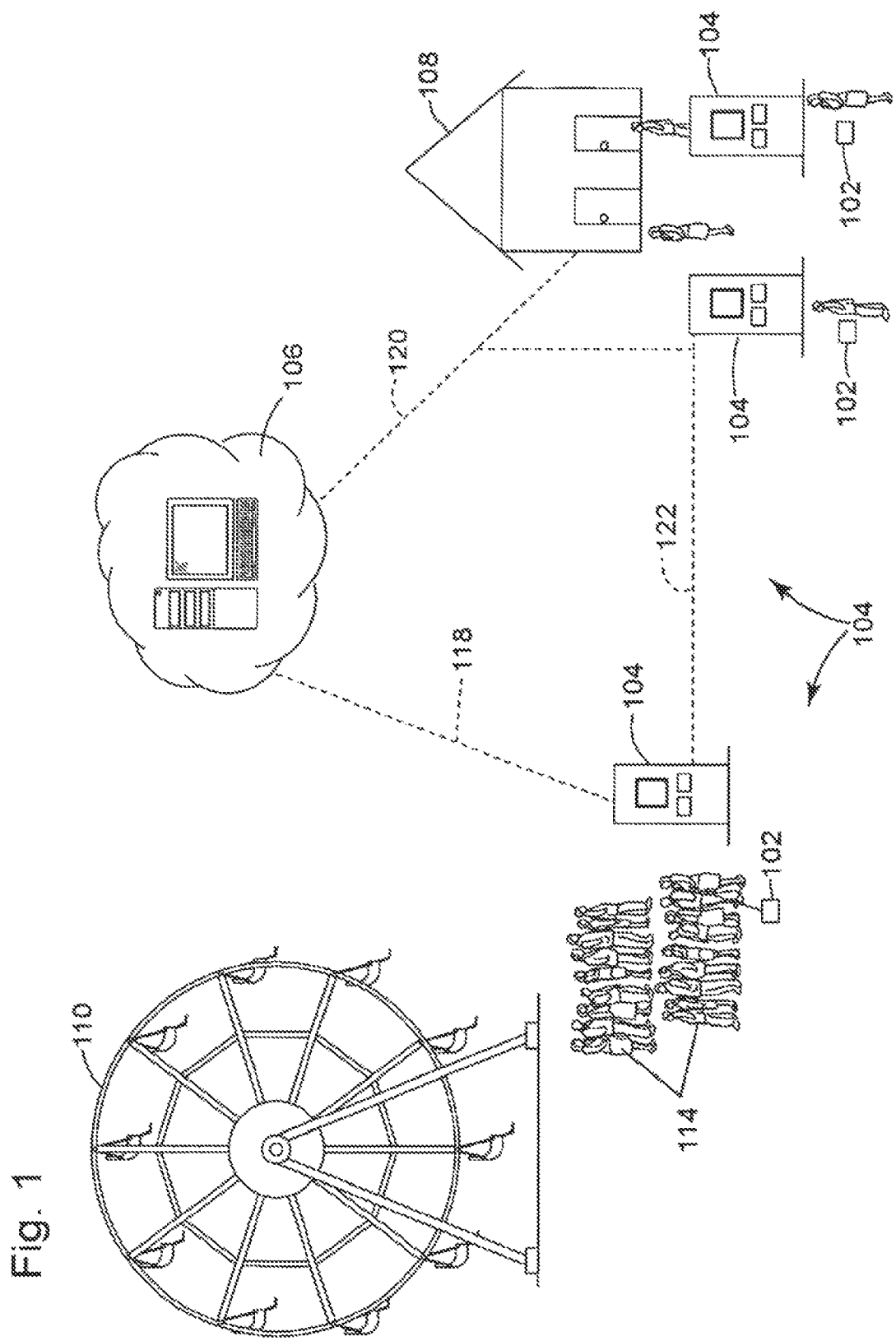
FIG. 1 is schematic diagram of a line queue management system to which embodiments of the present invention relate.

One embodiment of the present invention involves a system and method for managing line queues comprising a guest identification device, a device reader and a main processor unit. One particular advantage afforded by this invention is ability to provide guests with incentive to visit less popular attractions while decreasing line queues at more popular attractions.

Specific configurations and arrangements of the claimed invention, discussed below with reference to the accompanying drawings, are for illustrative purposes only. Other configurations and arrangements that are within the purview of a skilled artisan can be made, used, or sold without departing from the spirit and scope of the appended claims. For example, while some embodiments of the invention are herein described with reference to a theme park, a skilled artisan will recognize that embodiments of the invention can be implemented in any setting in which it is desirable to reduce long lines and wait times.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

Referring now to FIG. 1, a system for managing theme park ride lines is shown generally at 100. The system may comprise identifying devices 102, device readers 104, a main processor 106, a primary attraction 110 and a secondary attraction 108.

In one embodiment of the present invention, the identifying devices 102 are given to each guest 114 as they enter the park. Each identifying device 102 may be configured to uniquely identify each guest 114. Automatic identification and data capture (AIDC) devices such as radio frequency identification tags (RFIDs) may be used for example. Other guest identifying devices usable with the present invention may include bar-coded tickets, magnetic strip tickets, pin numbers, cellular phone identifiers, hotel room keys, credit card, etc. Any guest identifying device, or combination of guest identifying devices may have a reciprocal device reader that communicates with the guest identifier to track guest movement and spending. Furthermore, guest identification devices comprise handheld electronic devices with display screens.

In one optional embodiment, an RFID may be used as a guest identification device. Each guest may receive a RFID transponder as they enter the park, or they may obtain the transponder at a separate window. Management may choose to give the guest the transponder, or they may choose to allow the guest to rent a transponder. The RFID transponder may be configured to communicate with RFID readers that are placed at predetermined locations throughout the park, which may be chosen by park management based on circumstances to be discussed hereinafter.

In another optional embodiment of the present invention, a plurality of kiosks tickets or cards may be given to each guest as they enter the park, the ticket being configured to communicate with each of the kiosks placed at predetermined locations throughout the park. The kiosks, also referred to herein generally as "device readers" may be self-operational, allowing each guest to use a check-in/check-out method in which a guest may enter a predetermined location (e.g., a souvenir shop) in the park and check-in via kiosk. The guest may then check-out at the kiosk when leaving the predetermined location. The time spent at the first location may then be applied to the time spent in a line queue of a next predetermined location, (e.g., a ride), which will be discussed in greater detail with reference to FIG. 2.

With further reference to FIG. 1, device readers 104 may be placed at predetermined locations throughout the park. For example, management may choose to place device readers at any number of activity locations 108. The term "activity locations" is meant to refer to secondary attractions including but not limited to souvenir shops, restaurants, carnival games, entertainment shows, and food stands. Management may choose to place readers at the entrance, exit, and/or at the cash register of an activity location. The readers placed at the entrance and exits of the activity locations may be configured to track the amount of time the guest spends in the shop. In this exemplary embodiment, a guest may be able to check-in at the entrance using his identifying device in conjunction with the device reader. The same guest can then check-out at the exit using the same method. The amount of time the guest has spent at the activity location may then be stored in the processor of a guest identifier, the processor of a device reader, and the main processor 106, all of which may be connected via an internal network.

The device readers 104 may be further placed at a cash register of an activity location. This device reader 104 may be configured to track and store the amount of money a guest spends at the activity location, which may also be applied to the time the guest spends in a line queue of a primary attraction. As used herein, "primary attraction" is meant to comprise theme park rides and virtual entertainment venues where line queues tend to be particularly long due to high popularity. "Primary attractions" may also be referred to herein simply as "rides".

Again with reference to FIG. 1, the device readers 104 may be further placed at the entrance of primary attractions 110 (e.g., a ferris wheel). Guests 114 may produce their identifying device 102 for scanning via the device reader (e.g., kiosk, RFID reader, etc.). The device reader may then inform the guest of their status in the line queue, the guests status corresponding to the guests time and money spent at an activity locations throughout the park. The park may then allow the guests to move ahead in the line queue by this predetermined amount corresponding to the guests time and money spent at an activity location. For example, management of a park may choose an activity location in the park that has been historically less popular, such as a restaurant, and alert guests that if a guest spends X amount of time or money at this restaurant they will then be able to go a popular ride and spend X amount of time less in line.

Referring again to FIG. 1, the main processor 106 may be in communication with each of the readers 104 and guest identification devices 106 via a park network system comprising hard-wired LAN networks or wireless communication (e.g., Wi-Fi, Bluetooth™, etc.) as shown by lines 118, 120, and 122. The main processor 106 may comprise the main hardware system components (e.g., hard disc storage and networking components) together with main software components for a plurality of execution functions such as data storage and data retrieval. Guest identifying devices together with device readers may act as an interface between park guests and the network. In one embodiment of the present invention, the network may be fully automated and comprise a plurality a subsystems such as kiosks as multiple interfaces between guests and the network throughout the park.

In an exemplary embodiment, in which kiosks are used as device readers, guests may check-in at a kiosk at any predetermined activity location 108 using their identifying device, which may comprise any of bar-coded tickets, magnetic strip tickets, pin numbers, cellular phone identifiers, hotel room keys, or credit cards. If money is spent at the location, they may then use their guest identifier at the register so that the amount of money spent may be stored on the main processor 106 and/or on the guest identifier 102. The guest may then check-out of the secondary activity at kiosk 104.

The guest, having knowledge of which rides 110 have been designated as rides which allow guests to move up in line based on their time at secondary locations may then approach the a kiosk at this predetermined ride. The guest may place his identification device in the kiosk, and then be placed in line X amount of time ahead of where the guest would have been had he been forced to wait at the back of the line. Because theme park ride lines move at a known rate, park employees may be able to insert people in line at a location in which the guest will wait a known period of time, e.g., a known place in line being X minutes from entering the ride. In this particular embodiment each line may have an operator to insert a guest in the proper location in line. However, in an optional embodiment of the present invention, an auxiliary line may be used to insert guests who are using the identification device.

The present system may provide management with the ability to offer an incentive to guests to enter less popular secondary attractions such as souvenir shops. For example, park management may advertise that for each minute spent at ABC souvenir shop, two minutes of wait time may be deducted from the line at very popular XYZ ride. This heightens the chance that a guest will visit this secondary location because walking around a shop is preferential to standing in line, which will increase guest satisfaction. Also, shop revenue will increase as some of the guests may purchase an item they would not have originally seen.

While the present system may provide incentive for guests to enter less popular secondary attractions, the system may further provide the opportunity for management to offer the guest an incentive to enter more popular secondary attractions as well. For example, a highly popular restaurant will most likely include long wait lines for a table. A guest may desire to eat at the restaurant, but be unwilling to spend his or her time waiting in line to eat, when he or she could spend that time waiting in line at a popular ride (and purchase a cheaper meal at a food stand). However, the present system provides management with the ability to allow a guest to apply the time spent waiting on their table to a line queue of a popular ride. In this instance, guest satisfaction is increased because the guest gets to enjoy both the restaurant and the ride, and any time spent in line at the restaurant may be applied to the time spent in line at that particular ride. Furthermore, park profits are increased because guests are more willing to wait in line at a restaurant and spend money on more expensive food, rather than simply going to a food stand.

TABLE 1

Theme Park Queue Line Management
1. GUESTS EARNING POINT TABLE

|  | Money Spent | Time Spent |
|---|---|---|
| 1) Restaurant | | |
| Rank A Table Service | $1 spent = 1 point | 1 minute = 1 point |
| Rank B Self Service | $1 spent = 1 point | 1 service = 20 point |
| Rank C Stand | $1 spent = 1 point | 1 service = 10 point |
| 2) Retail Shop | $1 spent = 1 point | NA |
| 3) Other Facility (Carnival Game etc.) | | |
| 4) Attraction Rank C Less Popular | $1 spent = 1 point | NA |
| 5) Annual pass holder | NA | 1 experience = 10 point |
| | Get pass = 360 points | |

In an exemplary embodiment of the present invention, reducing the amount of time a guest spends in a line queue for a predetermined ride by the amount of time a guest spends at a predetermined location may comprise the use of a Guest Earning Point Table system, as shown in table 1. Referring to table 1, park management ranks different types of restaurants: Rank A being a table service restaurant (e.g., served by a wait staff); Rank B being a self-service restaurant (e.g., buffet style restaurant); and Rank C being a food stand (e.g., carnival-style funnel cake stand). For each restaurant rank, management establishes that a particular amount of money and/or time spent corresponds to a number of particular number of points. In this example, under the money spent column, one dollar spent equals one point for all restaurant ranks, while under the time spent column one minute spent at an A ranked restaurant may also equal one point. However, because of the difficulties in measuring time spent at a food stand, being that guests generally walk with their food and sit on random benches, management may choose to award points for a "service", that is, awarding 20 points for going to and making a purchase at a B ranked restaurant and 10 points for going to and making a purchase at a C ranked restaurant.

With further reference to table 1, one dollar spent at a retail type shops (e.g., souvenir shops) or a carnival game (e.g., balloon-dart game) corresponds to one point earned, and time spent at those attractions does not earn a guest any points.

Management may rank primary attractions as well. The most popular attractions (e.g., roller coasters) receive A ranks, moderately popular receive B ranks and least popular receive C ranks. A guest may earn 10 points for riding a C rank attraction, as shown in table 1. Lastly, in this exemplary embodiment, a guest may earn 360 points by becoming a annual pass holder as shown in row 5.

TABLE 2

GUEST CONSUMING POINT TABLE

| Attraction | |
|---|---|
| Rank A Most popular | Total 120 points required for 1 priority use |
| Rank B Standard | Total 60 points required for 1 priority use |

Referring now to table 2, a guest consuming point table is shown. Once guest earn points as shown in table 1, they may buy "priority uses" to move ahead in a line queue to a primary attraction with an A or B ranking. To move ahead in an A ranked attraction, 120 points are required, and to move ahead in a B ranked attraction, 60 points are required. By "priority use" is meant that a guest may move ahead in a line queue ahead of guests that did not earn a priority use by earning points at secondary attractions and low ranking primary attractions.

Referring now to FIG. 2, there is shown a flow chart to better help illustrate a method for managing theme park ride lines at 200. While the flowchart shows an exemplary step-by-step method, it is to be appreciated that a skilled artisan may rearrange or reorder the steps while maintaining like results.

The method, as shown, is split into management functions 202 and guest functions 204. Providing identifying devices to guests 206 may occur at the park entrance and may be free of charge, or optionally, guests may rent the devices for the day which may be provided at any number of stations throughout the park. Guest identifiers may also comprise bar-coded tickets, magnetic strip tickets, pin numbers, cellular phone identifiers, hotel room keys, and credit cards.

Management may then provide device readers at any number of predetermined activity locations 208 (e.g., souvenir shops, restaurants, carnival games, entertainment shows, food stands) and communicate which locations are chosen locations to the guests via pamphlet, signs or electronic methods such as speaker calls or display devices on the guest identifier.

Guests may then choose to go to one or more of these predetermined activity locations 210. If they choose to go, they may check-in using their guest identifier at a provided device reader. They may then choose to spend X amount of time and X amount of money at the predetermined location 212. Time may be tracked via the check-in/check-out method, while money spent may be tracked using the guest identifier and a device reader at a cash register.

Management may provide device readers at any number of predetermined primary attractions (e.g., rides) 214. Management may also provide guests with information about which primary attractions are subject to the shortened line queues with the use of the guest identification system. Guests may then choose to visit a particular primary attraction 216.

Management may then apply the time and money spent to the line queue of the guests choice, and reduce the amount time in the line queue by an amount that corresponds to the advertised amount 218. For example, if advertised that 10 minutes at secondary attraction A is worth 10 minutes of wait time at primary attraction B, and the line at primary attraction B is 1 hour, then the guest may skip ahead in the line queue and only be expected wait approximately 50 minutes before entering the ride 220.

In an optional embodiment of the present invention, guests may be further permitted to purchase line queue time at device readers throughout the park or cash registers throughout the park. The time may be applied via any guest identification device.

Although specific features of various embodiments of the invention may be shown in some drawings and not in others, this is for convenience only. In accordance with the principles of the invention, the feature(s) of one drawing may be combined with any or all of the features in any of the other drawings. The words "including", "comprising", "having", and "with" as used herein are to be interpreted broadly and comprehensively and are not limited to any physical interconnection. Moreover, any embodiments disclosed herein are not to be interpreted as the only possible embodiments. Rather, modifications and other embodiments are intended to be included within the scope of the appended claims.

What is claimed is:

1. A system for managing attraction queues comprising:
   a device-reader system configured to communicate monetary transaction information with an identification device at one or more accrual locations and/or configured to ascertain an amount of time spent by the identification device at one or more accrual locations; and
   a processor configured to receive data indicative of a purchase by a guest at a particular accrual location and/or configured to receive data indicative of the amount of time spent by the identification device at the one or more accrual locations from the device-reader system, wherein the processor is configured to assign the guest a location within a queue of an attraction at a redemption location such that a wait time in the queue for the guest is reduced relative to an otherwise available wait time by an amount of time correlative to the amount of time spent by the identification device at the one or more accrual locations and/or by an amount of time correlative to the purchase.

2. The system of claim 1, wherein the processor is configured to assign the guest the location within the queue such that the wait time in the queue is reduced for the guest relative to the otherwise available wait time by an increment of time for each particular amount of money spent on the purchase or by an increment of time associated with an assigned level of the purchase.

3. The system of claim 2, wherein the processor is configured to assign the guest the location within the queue such that the wait time in the queue is reduced for the guest by one minute for every dollar of money spent on the purchase.

4. The system of claim 1, wherein the processor is configured to assign the guest the location within the queue such that the wait time in the queue is reduced for the guest by an increment of time for every point accrued by the identification device, and wherein the processor is configured to assign different amounts of points for time spent at different accrual locations and/or different amounts of money spent at the different accrual locations to the identification device.

5. The system of claim 4, wherein the processor is configured to assign more points for time spent or money spent at a first accrual location than for time spent or money spent at a second accrual location.

6. The system of claim 1, wherein the processor is configured to receive data indicative of a priority use purchase by the guest to move the guest ahead in the queue.

7. The system of claim 1, wherein the processor is configured to assign the guest the location within the queue of the attraction at the redemption location by alerting an operator to an equivalent wait time to credit to the guest or alerting the operator to a physical location to place the guest between other guests in the line.

8. The system of claim 1, wherein the one or more accrual locations comprise a ride or a restaurant and the processor is configured to reduce the wait time in the queue for the guest based on time spent waiting to get on the ride or to be seated at the restaurant.

9. The system of claim 1, wherein the processor is configured to assign the guest the location within the queue of the attraction at the redemption location during an initial visit by the guest to the redemption location.

10. The system of claim 1, wherein the one or more accrual locations comprise primary accrual locations and secondary accrual locations, and wherein the processor is configured to reduce the wait time in the queue for the guest more heavily for time spent by the identification device at the secondary accrual locations than for time spent by the identification device at the primary accrual locations.

11. The system of claim 1, wherein the processor is configured to reduce the wait time in the queue for the guest in a one-to-one ratio based on time spent waiting at the one or more accrual locations.

12. A system for managing attraction queues comprising:
    a processor configured to:
    receive data indicative of an amount of money spent using an identification device assigned to a guest at one or more accrual locations; and
    assign a location within a queue of an attraction at a redemption location to a guest that has been assigned the identification device such that a wait time in the queue for the guest is reduced relative to an otherwise available wait time by an amount of time correlative to the amount of money spent by the identification device at the one or more accrual locations.

13. The system of claim 12, wherein the processor is configured to receive data indicative of an amount of time spent by the identification device at the one or more accrual locations and reduce the wait time in the queue for the guest based the amount of time spent.

14. The system of claim 12, comprising a device-reader system configured to:
    communicate with the identification device;
    ascertain an amount of time and/or the money spent by the identification device at the one or more accrual locations; and
    communicate the amount of time and/or the amount of money spent by the identification device at the one or more accrual locations to the processor.

15. The system of claim 12, comprising a cash register configured to communicate the data indicative of the amount of money spent with the identification device.

16. The system of claim 12, wherein the amount of money spent using the identification device at the one or more accrual locations comprises an amount of money spent using the identification device at a first accrual location and an amount of money spent using the identification device at a second accrual location.

17. A method of queue management, comprising:
  monitoring an identification device assigned to a guest by a monitoring system to ascertain an amount of money spent using the identification device at one or more accrual locations; and
  assigning the guest a location within a queue of an attraction at a redemption location by a processor such that a wait time in the queue for the guest is reduced relative to an otherwise available wait time by an amount of time correlative to the amount of money spent using the identification device at the one or more accrual locations.

18. The method of claim 17, comprising determining the amount of time correlative to the amount of money spent based on money spent at a first accrual location multiplied by a first multiplier assigned to the first accrual location, and based on money spent at a second accrual location multiplied by a second multiplier assigned to the second accrual location.

19. The method of claim 17, comprising informing the guest of the location within the queue via the monitoring system.

20. The method of claim 17, comprising monitoring a location of the identification device and time spent by the identification device at the one or more accrual locations.

* * * * *